United States Patent
Robinson et al.

(10) Patent No.: US 7,407,097 B2
(45) Date of Patent: Aug. 5, 2008

(54) TOLL FEE SYSTEM AND METHOD

(75) Inventors: Benjamin P. Robinson, Plano, TX (US); Debbie Lemon, Carrollton, TX (US)

(73) Assignee: Rent a Toll, Ltd., Plano, TX (US)

(*) Notice: Subject to any disclaimer, the term of this patent is extended or adjusted under 35 U.S.C. 154(b) by 0 days.

(21) Appl. No.: 11/125,521

(22) Filed: May 10, 2005

(65) Prior Publication Data

US 2005/0279831 A1    Dec. 22, 2005

Related U.S. Application Data

(60) Provisional application No. 60/657,235, filed on Feb. 28, 2005, provisional application No. 60/569,779, filed on May 10, 2004.

(51) Int. Cl.
*G07B 15/02* (2006.01)

(52) U.S. Cl. .................................. 235/384; 705/13

(58) Field of Classification Search ............... 235/384; 705/13
See application file for complete search history.

(56) References Cited

U.S. PATENT DOCUMENTS

| | | | |
|---|---|---|---|
| 4,510,495 A | 4/1985 | Sigrimis et al. | |
| 4,525,713 A | 6/1985 | Barletta et al. | |
| 4,546,241 A | 10/1985 | Walton | |
| 5,396,417 A * | 3/1995 | Burks et al. | 705/17 |
| 5,525,991 A | 6/1996 | Nagura et al. | |
| 5,602,919 A * | 2/1997 | Hurta et al. | 705/65 |
| 5,819,234 A | 10/1998 | Slavin et al. | |
| 5,935,190 A | 8/1999 | Davis et al. | |
| 5,948,038 A | 9/1999 | Daly et al. | |
| 6,087,963 A | 7/2000 | Kobayashi et al. | |
| 6,111,523 A | 8/2000 | Mee | |
| 6,175,800 B1 | 1/2001 | Mori et al. | |
| 6,181,259 B1 | 1/2001 | Yamashita | |
| 6,191,705 B1 * | 2/2001 | Oomen et al. | 340/905 |
| 6,195,019 B1 | 2/2001 | Nagura | |
| 6,198,913 B1 | 3/2001 | Sung et al. | |
| 6,198,987 B1 | 3/2001 | Park et al. | |
| 6,218,963 B1 | 4/2001 | Kawanabe et al. | |
| 6,233,519 B1 | 5/2001 | Yamada | |
| 6,252,523 B1 | 6/2001 | Mostrom | |
| 6,252,524 B1 | 6/2001 | Takikita | |
| 6,275,552 B1 | 8/2001 | Ando | |
| 6,278,935 B1 | 8/2001 | Kaplan et al. | |
| 6,285,858 B1 | 9/2001 | Yoshida | |
| 6,300,882 B1 | 10/2001 | Inoue | |

(Continued)

OTHER PUBLICATIONS

U.S. Appl. No. 11/651,414, Robinson et al.

(Continued)

*Primary Examiner*—Jamara A Franklin
(74) *Attorney, Agent, or Firm*—Winstead PC

(57) ABSTRACT

A toll fee tracking system comprising a toll authority adapted to collect data associated with at least one toll fee tracking device and a toll rental entity adapted to communicate with the toll authority and a third part entity. The toll rental entity further acts as a communication channel between the toll authority and the third party entity for forwarding data from the toll authority to the third party entity.

34 Claims, 8 Drawing Sheets

U.S. PATENT DOCUMENTS

| | | | |
|---|---|---|---|
| 6,308,893 | B1 | 10/2001 | Waxelbaum et al. |
| 6,326,900 | B2 | 12/2001 | DeLine et al. |
| 6,337,639 | B1 | 1/2002 | Kojima |
| 6,340,934 | B1 | 1/2002 | Hisada |
| 6,342,844 | B1 | 1/2002 | Rozin |
| 6,373,402 | B1 | 4/2002 | Mee |
| 6,388,579 | B1 | 5/2002 | Adcox et al. |
| 6,390,365 | B1 | 5/2002 | Karasawa |
| 6,390,429 | B1 | 5/2002 | Brincat |
| 6,396,418 | B2 | 5/2002 | Naito |
| 6,411,889 | B1 | 6/2002 | Mizunuma et al. |
| 6,437,706 | B2 | 8/2002 | Sato et al. |
| 6,446,049 | B1 | 9/2002 | Janning et al. |
| 6,449,555 | B1 | 9/2002 | Ohba et al. |
| 6,459,385 | B2 | 10/2002 | Yamashita |
| 6,463,384 | B1 | 10/2002 | Kaplan et al. |
| 6,509,843 | B1 | 1/2003 | Fuyama |
| 6,538,580 | B2 | 3/2003 | Bostrom et al. |
| 6,542,815 | B1 | 4/2003 | Ishizaki et al. |
| 6,603,406 | B2 | 8/2003 | Jambhekar |
| 6,642,851 | B2 | 11/2003 | Deline et al. |
| 6,653,946 | B1 | 11/2003 | Hassett |
| 6,658,392 | B2 | 12/2003 | Yoshida |
| 6,658,775 | B1 | 12/2003 | Lanzisero |
| 6,661,352 | B2 | 12/2003 | Tiernay et al. |
| 6,683,580 | B2 | 1/2004 | Kuramoto |
| 6,683,956 | B1 | 1/2004 | Aikawa et al. |
| 6,684,155 | B1 | 1/2004 | Chen et al. |
| 6,705,521 | B1 | 3/2004 | Wu et al. |
| 6,737,986 | B2 | 5/2004 | Fuyama |
| 6,744,377 | B1 | 6/2004 | Inoue |
| 6,756,915 | B2 | 6/2004 | Choi |
| 6,774,810 | B2 | 8/2004 | Deline et al. |
| 6,791,475 | B2 | 9/2004 | Yamashita |
| 6,796,499 | B1 | 9/2004 | Wang |
| 6,816,707 | B1 | 11/2004 | Barker et al. |
| 6,834,267 | B1 | 12/2004 | Fuyama |
| 6,856,820 | B1 | 2/2005 | Kolls |
| 6,883,710 | B2 * | 4/2005 | Chung ............... 235/385 |
| 6,904,362 | B2 | 6/2005 | Nakashima et al. |
| 6,909,876 | B2 | 6/2005 | Higashino et al. |
| 6,920,379 | B2 | 7/2005 | Miyamoto |
| 6,937,162 | B2 | 8/2005 | Tokitsu et al. |
| 6,965,438 | B2 | 11/2005 | Lee et al. |
| 6,966,489 | B2 | 11/2005 | Grant |
| 6,985,931 | B2 | 1/2006 | Dowling |
| 6,999,001 | B2 | 2/2006 | Kojima |
| 7,053,793 | B2 * | 5/2006 | Tajima et al. ............ 340/928 |
| 2001/0025251 | A1 | 9/2001 | Konishi et al. |
| 2002/0002534 | A1 | 1/2002 | Davis et al. |
| 2002/0018005 | A1 | 2/2002 | Fuyama |
| 2002/0052837 | A1 | 5/2002 | Bouthors |
| 2002/0067291 | A1 | 6/2002 | Ikeda |
| 2002/0072963 | A1 | 6/2002 | Jonge |
| 2002/0097178 | A1 * | 7/2002 | Thomas et al. ........... 342/47 |
| 2002/0111851 | A1 | 8/2002 | Folkers |
| 2002/0145039 | A1 | 10/2002 | Carroll |
| 2002/0178050 | A1 | 11/2002 | Sone |
| 2002/0194137 | A1 | 12/2002 | Park et al. |
| 2003/0026430 | A1 | 2/2003 | Aikawa et al. |
| 2003/0046145 | A1 | 3/2003 | Miao |
| 2003/0067396 | A1 | 4/2003 | Hassett |
| 2003/0069784 | A1 | 4/2003 | Banerjee et al. |
| 2003/0105662 | A1 | 6/2003 | Koketsu et al. |
| 2003/0109223 | A1 | 6/2003 | Toyama |
| 2003/0110075 | A1 | 6/2003 | Shioda et al. |
| 2003/0112125 | A1 | 6/2003 | Saegrov |
| 2003/0115095 | A1 | 6/2003 | Yamauchi |
| 2003/0200227 | A1 | 10/2003 | Ressler |
| 2004/0046019 | A1 | 3/2004 | Kojima |
| 2004/0083130 | A1 * | 4/2004 | Posner et al. ............ 705/13 |
| 2004/0153401 | A1 | 8/2004 | Gila et al. |
| 2004/0162788 | A1 | 8/2004 | Sakamoto |
| 2004/0174272 | A1 | 9/2004 | Lin |
| 2004/0178929 | A1 | 9/2004 | Toyama |
| 2004/0212518 | A1 | 10/2004 | Tajima et al. |
| 2004/0227616 | A1 | 11/2004 | Lafferty |
| 2004/0236685 | A1 | 11/2004 | Gila |
| 2004/0245302 | A1 | 12/2004 | McNicholas |
| 2004/0263356 | A1 | 12/2004 | Wu et al. |
| 2004/0266500 | A1 | 12/2004 | Gila et al. |
| 2005/0005488 | A1 | 1/2005 | Burke |
| 2005/0010478 | A1 | 1/2005 | Gravelle |
| 2005/0033505 | A1 | 2/2005 | Zatz |
| 2005/0034340 | A1 | 2/2005 | Burke |
| 2005/0040221 | A1 | 2/2005 | Schwarz, Jr. |
| 2005/0071175 | A1 | 3/2005 | Gila et al. |
| 2005/0097018 | A1 | 5/2005 | Takida |
| 2005/0102211 | A1 | 5/2005 | Freeny |
| 2005/0119010 | A1 | 6/2005 | Yasukawa |
| 2005/0157677 | A1 | 7/2005 | Dowling |
| 2005/0159133 | A1 | 7/2005 | Hasan et al. |
| 2005/0168351 | A1 | 8/2005 | Saze et al. |
| 2005/0168352 | A1 | 8/2005 | Tomer |
| 2005/0169227 | A1 | 8/2005 | Dowling |
| 2005/0169228 | A1 | 8/2005 | Dowling |
| 2005/0170824 | A1 | 8/2005 | Dowling |
| 2005/0170825 | A1 | 8/2005 | Dowling |
| 2005/0179522 | A1 | 8/2005 | Saegrov |
| 2005/0187701 | A1 | 8/2005 | Baney |
| 2005/0195841 | A1 | 9/2005 | Dowling |
| 2005/0195842 | A1 | 9/2005 | Dowling |
| 2005/0197976 | A1 * | 9/2005 | Tuton et al. ............ 705/417 |
| 2005/0216187 | A1 | 9/2005 | Hartinger |
| 2007/0124197 | A1 | 5/2007 | Robinson et al. |
| 2007/0124198 | A1 | 5/2007 | Robinson et al. |
| 2007/0124199 | A1 | 5/2007 | Robinson et al. |
| 2007/0192177 | A1 | 8/2007 | Robinson et al. |

OTHER PUBLICATIONS

U.S. Appl. No. 11/580,527, Robinson.
U.S. Appl. No. 11/810,751, filed Dec. 18, 2006, Robinson et al.
U.S. Appl. No. 11/985,985, Robinson et al.
U.S. Appl. No. 11/903,687, Robinson et al.
U.S. Appl. No. 11/640,550, Robinson et al.
U.S. Appl. No. 11/640,586, Robinson et al.
U.S. Appl. No. 11/803,933, Robinson et al.
U.S. Appl. No. 11/810,752, Robinson et al.
"Overview of Meeting Proceedings", 2004 IBTTA Technology Committee, Spring Technology Workshop, Miami, Florida, USA, (4 pages).
Dick Schnacke, "The 5.9 GHZ DSRC Prototype Development Program", IBTTA Technology Workshop, Madrid, Spain, Nov. 14, 2004, (37 pages).

* cited by examiner

TOLL FEE SYSTEM AND METHOD

CROSS-REFERENCE TO RELATED APPLICATIONS

This application claims priority from and incorporates by reference the entire disclosure of U.S. Provisional Patent Application No. 60/569,779, which was filed on May 10, 2004. This application further claims priority from and incorporates by reference the entire disclosure of U.S. Provisional Patent Application No. 60/657,235, which was filed on Feb. 28, 2005.

BACKGROUND OF THE INVENTION

1. Technical Field

The present invention relates generally to toll fee tracking systems and methods and, more particularly, but not by way of limitation, to toll fee tracking systems and methods for automatic, non-contact, high-speed toll fee tracking of vehicular tolls associated with a toll tracking device used by vehicle operators.

2. History of Related Art

The crowding of highways within metropolitan areas has resulted in the development of additional traffic arteries known as toll roads. Toll roads have become increasingly popular, however, they require the payment of a toll fee for use by vehicular occupants. The collection of tolls by conventional means has had a negative effect upon highway throughput and safety. Congestion and long backups on toll plazas are becoming more common. Such conditions involve a significant economic cost, through lost time and reduced productivity. Moreover, serious accidents at toll plazas, caused by operators or mechanical failures, have also increased in frequency.

Certain toll authorities have attempted to respond to these problems by providing coin-operated toll collection devices, or by instituting a toll-plate system in which toll-takers visually inspect each incoming vehicle for an appropriate toll plate or sticker. Coin operated toll collection systems, however, do little to increase throughput, and are susceptible to fraud through the use of counterfeit coins. Toll-plate systems suffer the same deficiencies, requiring each vehicle to slow sharply while entering the visual inspection area. In later years, a development ensued that revolutionized toll road travel. This was the development of the toll fee tracking device.

One example of a toll fee tracking device is set forth and shown in U.S. Pat. No. 4,546,241 issued Oct. 8, 1985. This patent relates to an electronic identification and recognition system that includes a portable card having a circuit therein for generating and transmitting an identifying signal. The identifying signal includes predetermined frequency pulses. The card functions in cooperation with a reader which radiates a radio frequency carrier signal received by an antenna in the card. This signal is used both to power the circuit of the card and to provide the basic frequency signal which is modified to generate secondary frequency signals which are transmitted back to the reader in a predetermined sequence identifying the card.

Today, those individuals who frequently use toll roads are now prone to the purchase of toll fee tracking device. The toll fee tracking device allows the vehicular occupant to bypass the cash only toll gate and, in many instances, the vehicle can maintain its normal speed as it traverses the toll gate wherein the passage of the toll fee tracking device is recorded. The popularity of the toll fee tracking device has expanded to the point that the normal user of the toll fee tracking device can be frustrated by the lines at toll gates when the toll fee tracking device is not available. Unavailability of a toll fee tracking device can be for numerous reasons, not the least of which is the use of rental cars.

The rental car business is worldwide and continually expanding. Toll fee tracking devices are not, however, as known to the inventors hereof, available in rental cars. This is due, at least in part, to the fact that the charges for the toll fee tracking device are not typically generated in a manner allowing billing of the toll fee tracking device event during the duration of some car rentals. Typically toll fee tracking device invoices are delivered on a monthly basis while the toll fee data is not processed in a real-time. For business travelers, paying tolls in a rental car usually involves waiting at a toll gate with a live operator so that a receipt may be generated for later expense report purposes. Monthly toll fee invoices to car rental agencies reflecting use of a toll fee tracking device in a given vehicle over a period of time would inherently create a plethora of problems, not the least of which would be collection of toll fees by a vehicle renter who has long since turned in his or her expense report. Moreover, the current economic system for rental agencies typically requires that the entire financial transaction be completed at the time of turning in the rental car, unless some damage has occurred relative to the use thereof. Therefore, there is a need for a method and system facilitating use of, and financial accountability for, a toll fee tracking device used by vehicle operators such as, for example, rental car users.

SUMMARY OF THE INVENTION

A toll fee tracking system comprising a toll authority adapted to collect data associated with at least one toll fee tracking device and a toll rental entity adapted to communicate with the toll authority and a third part entity.

A method for toll fee tracking, the method comprising collecting, at a toll authority, data associated with at least one toll fee tracking device. The method further includes storing the data in at least one database of the toll authority and communicating, via a toll rental entity, the data to a third party entity.

A toll rental entity server for communicating data between a toll authority and a third party entity, the server comprising a first interface for communicating with the toll authority. The server further includes at least one database and a second interface for communicating with the third party entity. The communication between said toll authority and the third party entity occurs in real-time or near real-time.

BRIEF DESCRIPTION OF THE DRAWINGS

A more complete understanding of the present invention may be obtained by reference to the following Detailed Description of Illustrative Embodiments of the Invention, when taken in conjunction with the accompanying Drawings, wherein.

DETAILED DESCRIPTION OF ILLUSTRATIVE EMBODIMENTS OF THE INVENTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Figure 1:
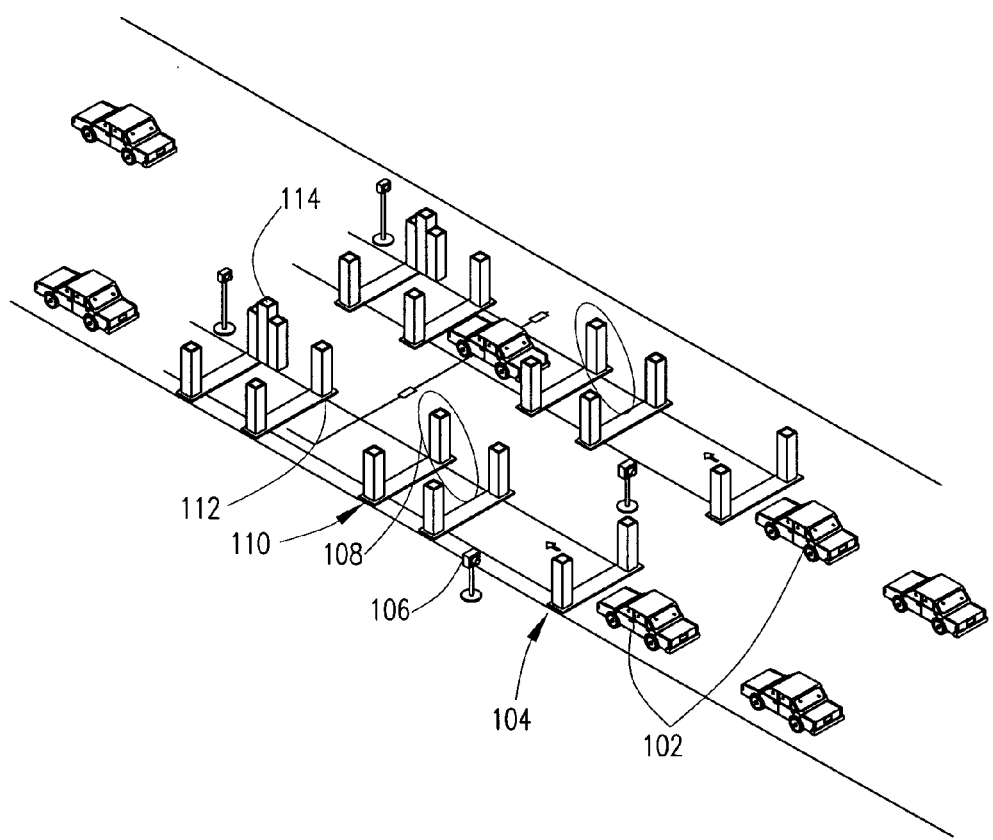
FIG. 1 is a perspective view illustrating an exit of a toll road in which an automatic toll collection system is installed.

FIG. 1 illustrates two Electronic Toll Collection (ETC) lanes 102. In each of the ETC lanes 102, tolls are automatically collected from each vehicle along the lanes 102 through radio communication between a toll fee tracking device (e.g., a radio frequency integrated device (RFID) transponder) installed in the vehicle and a toll collection unit installed on each ETC lane 102. The toll collection units are typically owned by a toll authority and are situated on toll authority property. Those skilled in the art will appreciate that the invention can be practiced in connection with roadways having additional lanes, including multi-lane divided highways, bridges, and tunnels. As one skilled in the art will appreciate the invention can also be practiced in connection with numerous other transport systems such as, for example, railways and waterways.

On each ETC lane 102, a vehicle type identifying device 104, a license plate monitor camera 106, an antenna 108, a vehicle detector 110, and a display 112 are arranged. The vehicle type identifying device 104 identifies the type of a vehicle passing thereby. The license plate monitor camera 106 captures an image of a license plate of the vehicle to read a license plate number out of the image. The vehicle detector 110 may be, for example, a photoelectric cell for optically sensing the presence of a vehicle and generating a VEHICLE PRESENT signal.

Figure 2:
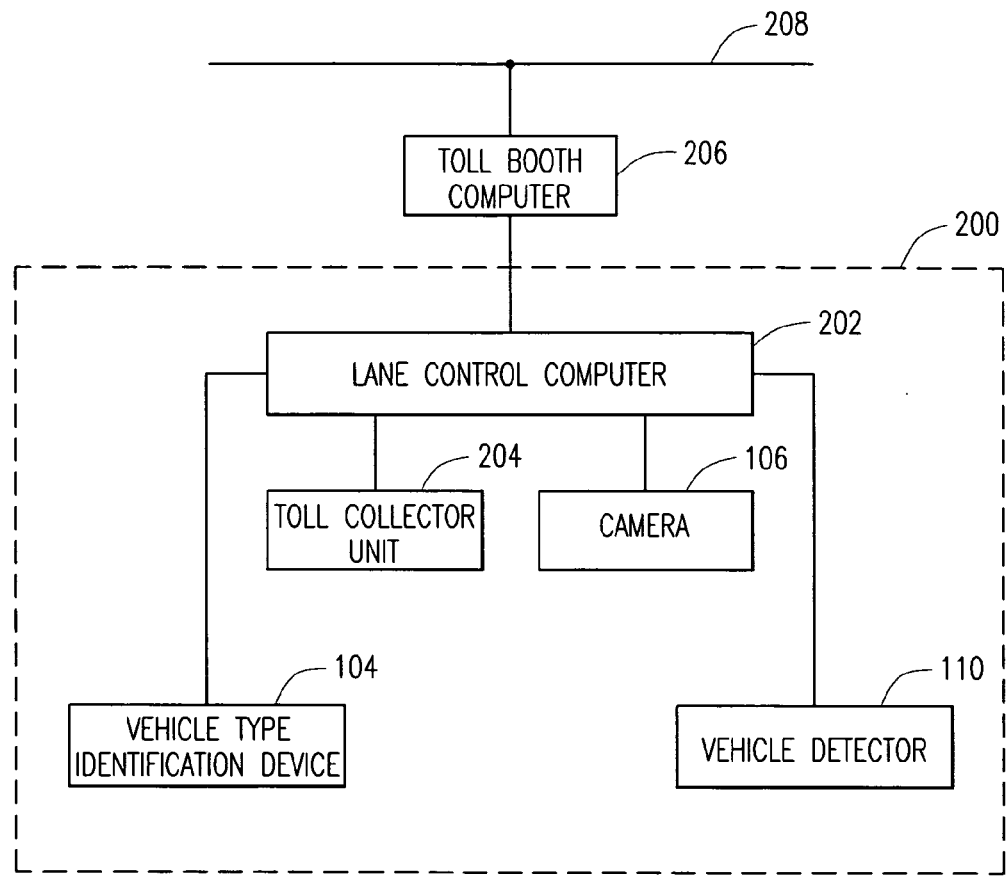
FIG. 2 illustrates a control device installed on an electronic toll collection lane.

The automatic toll collection system includes a control device 200, as shown in FIG. 2, one for each ETC lane 102. The control device 200 has a lane control computer 202 which controls operations of the vehicle type identifying device 104, the license plate monitor camera 106, and a toll collecting unit 204. The control device 200 receives information signals from the vehicle detector 110 indicating the passing of the vehicle. The lane control computer communicates with a toll booth computer 206. The toll booth computer 206 communicates with a network 208 for transmission of information.

Figure 3:
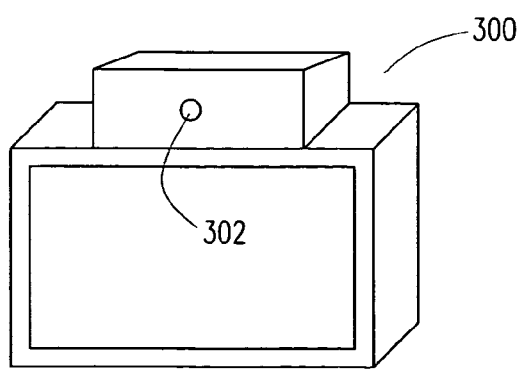
FIG. 3 illustrates an electronic toll fee tracking device installed in each vehicle.

FIG. 3 illustrates a toll fee tracking device 300 installed in each vehicle passing through either of the ETC lanes 102. As an exemplary embodiment, a radio frequency integrated device (RFID) transponder is utilized as the toll fee tracking device 300. Each vehicle is identified using the RFID transponder 300. The RFID transponder 300 includes a microchip attached to an antenna 302. The antenna 302 may be, for example, incorporated into the transponder 300 itself or a receptacle may be provided to attach to a conventional window mounted antenna, similar to those employed in connection with cellular telephone devices. The microchip contains information that identifies a particular toll rental entity account with a toll authority account. Each RFID transponder 300 is identified by a unique identification number (e.g., transponder Id). The RFID transponder 300 further includes circuitry for establishing a radio communication between the RFID transponder 300 and the toll collecting unit through the antenna 302.

Figure 4:
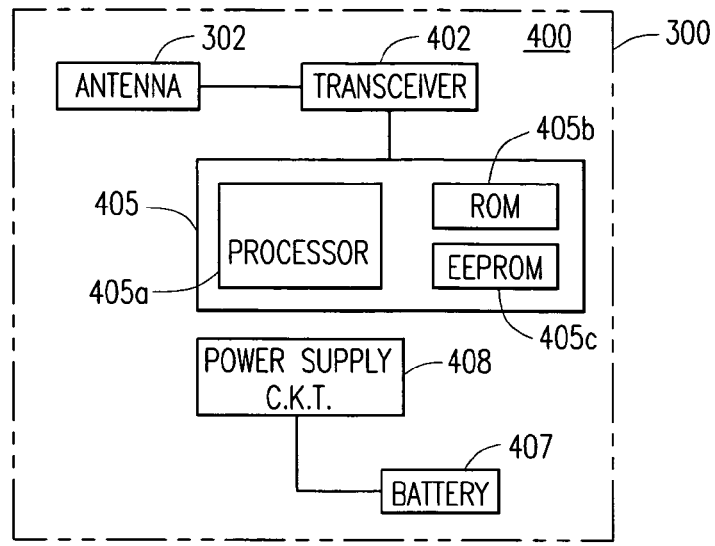
FIG. 4 illustrates a schematic block diagram of the toll fee tracking device.

FIG. 4 illustrates a schematic block diagram 400 of the toll fee tracking device 300 (i.e., the transponder) as illustrated in FIG. 3. The transponder 300 includes an antenna 302, a transceiver 402, and a control circuit 405. The transceiver 402 establishes radio communications between the transponder 300 and the toll collection unit 204 (FIG. 2) through the antenna 302. The control circuit 405 further includes a processor 405a, a mask ROM 405b, and an EEPROM 405c. The processor 405a performs the various programs stored in the mask ROM 405b. The EEPROM 405c stores therein transponder identification number and status data. The processor 405a may be, for example, an 8086 microprocessor or an 8051 microcontroller, or any other processor capable of executing the functions described above.

The transponder 300 may also includes a battery 407 and a power supply circuit 408. The power supply circuit 408 supplies power to the components of the transponder 300. For exemplary purposes, a transponder 300 powered by a battery 407 is shown. The RFID transponder 300 may be, for example, an active transponder or a passive transponder. Passive transponders do not require a battery to derive power for operation. Passive transponders derive power to operate from the electric field generated by the passive transponder. In addition, passive transponders are long lasting and support multiple frequency ranges. However, active transponders have a battery for deriving power for operation and support only one frequency. According to exemplary embodiments of the present invention, the RFID transponder 300 may be placed on interior region of the vehicle, for example, on a windshield of the vehicle. According to other exemplary embodiments of the present invention, the RFID transponder 300 may be placed on an exterior region of the vehicle, for example, on the roof or the license plate of the vehicle.

Figure 5A:
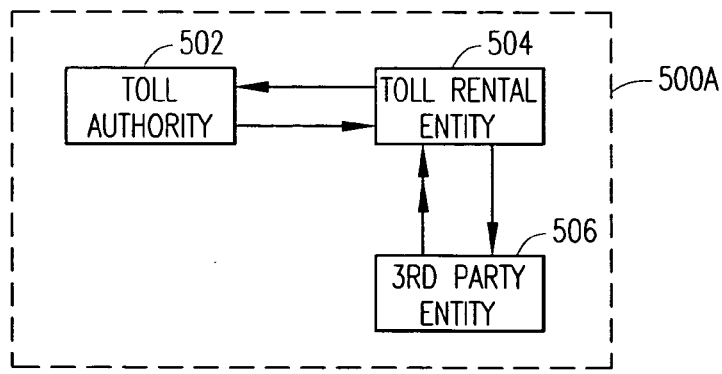
FIG. 5A illustrates a block diagram of a toll fee system in accordance with an embodiment of the present invention.

FIG. 5A illustrates a block diagram 500A of a toll fee system in accordance with an embodiment of the present invention. The system 500A includes a toll authority 502, a toll rental entity 504, and a third party entity 506. The toll rental entity 504 interfaces with both a toll authority 502 and a third party entity 506. When a vehicle having a valid RFID transponder 300 passes through a toll gate of the toll authority 502, the transponder 300 is read by the toll gate of the toll authority 502. The toll authority 502 collects data such as an identifier and toll fee assessed and allows access to at least a subset of the toll data. The toll rental entity 504 or the third party entity 506 that utilizes the toll rental entity 504 within the third party entity's 506 existing system may access at least a subset of the data collected by the toll authority 502. The data which includes information related to the fee charged to a particular transponder 300 may be passed from the toll rental entity 502 to the third party entity 504 in real-time or near real-time such that the vehicle operators are charged for any toll related charges. The vehicle operator may be, for example, a rental vehicle operator, an operator of a leased vehicle or the like. In short, the toll rental entity 504 acts as a communication channel between the toll authority 502 and the third party entity 506 for forwarding data from the toll authority 502 to the third party entity 506 in a real-time or near real-time fashion.

Figure 5B:
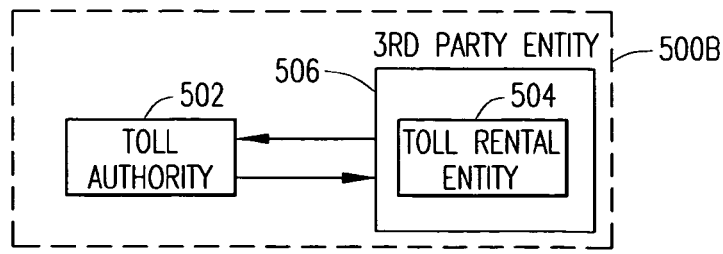
FIG. 5B illustrates a block diagram of a toll fee system in accordance with an alternate embodiment of the present invention.

FIG. 5B illustrates an alternate embodiment of the toll fee system 500B in accordance with an alternate embodiment of the present invention. The toll rental entity 504 may be integrated into an existing operating system of the third party entity 506. The third party entity 506 may request data directly from the toll authority 502. The third party entity 506 then utilizes the toll rental entity 504 to store data and reconcile accounts in a similar manner as that noted above with respect to FIG. 5A with the exception of transmitting and requesting data between the stand-alone toll rental entity 504 and the third party entity 606.

Figure 5C:
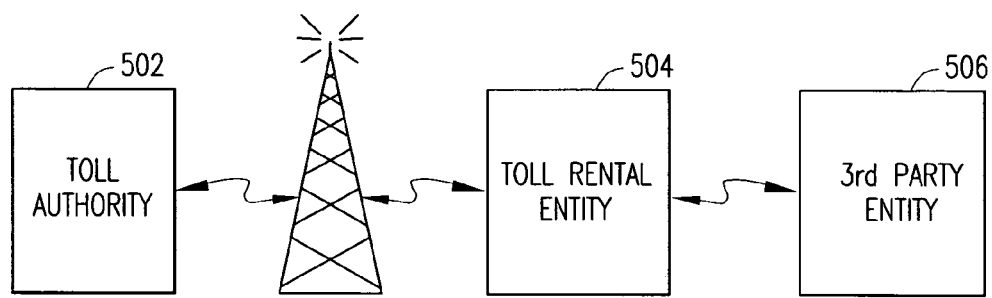
FIG. 5C illustrates a block diagram of a wireless system utilized in conjunction with the present invention.

FIG. 5C illustrates a block diagram of a wireless system utilized in conjunction with the present invention. Although all portions of the system of FIGS. 5C and 5D (described in detail below) are shown communicating via wireless links, it will understood by one skilled in the art that one or more portions of the system may be communicated via a wired network or other technology. In a similar manner to that of FIGS. 5A and 5B, communications between the toll authority 502, toll rental entity 504, and the third party entity 506 may be communicated via a request and response scenario, or via a push/pull scenario. In both scenarios, the data may be requested or sent in real-time or at some predefined regular intervals.

Referring to FIG. 5C, the toll rental entity 504 may request and pull data from the toll authority 502 via a wireless link. In an alternate embodiment, the toll authority 502 may push/transmit data from the toll authority 502 to the toll rental entity 504. The toll rental entity 504 may then transmit the data to the third party entity 506. In an alternate embodiment, the third party entity 506 may request specific data from the toll rental entity 504, which may thereafter transmit the requested data to the third party entity 506.

Figure 5D:
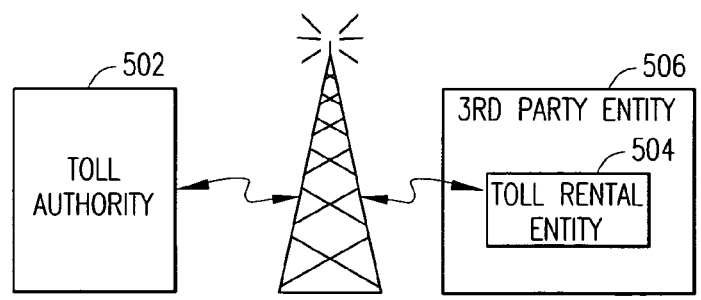
FIG. 5D illustrates a block diagram of a wireless system utilized in conjunction with an alternate embodiment of the present invention.

FIG. 5D illustrates a block diagram of a wireless system utilized in conjunction with an alternate embodiment of the present invention. As noted above with respect to FIG. 5C, toll data may be requested and pulled from the toll authority 502 by the toll rental entity 504. Alternatively, the toll authority 502 may push the toll data to the toll rental entity 504. The toll rental entity 504 may then transmit the data to the third party entity 506 to perform other operations such as, for example, billing, account reconciliation etc. Some or all the communications between the toll authority 502, and the toll rental entity 504 and/or third party entity 506 may be via, for example, a wireless telecommunications network, wired networks, or other technology.

Figure 6A:
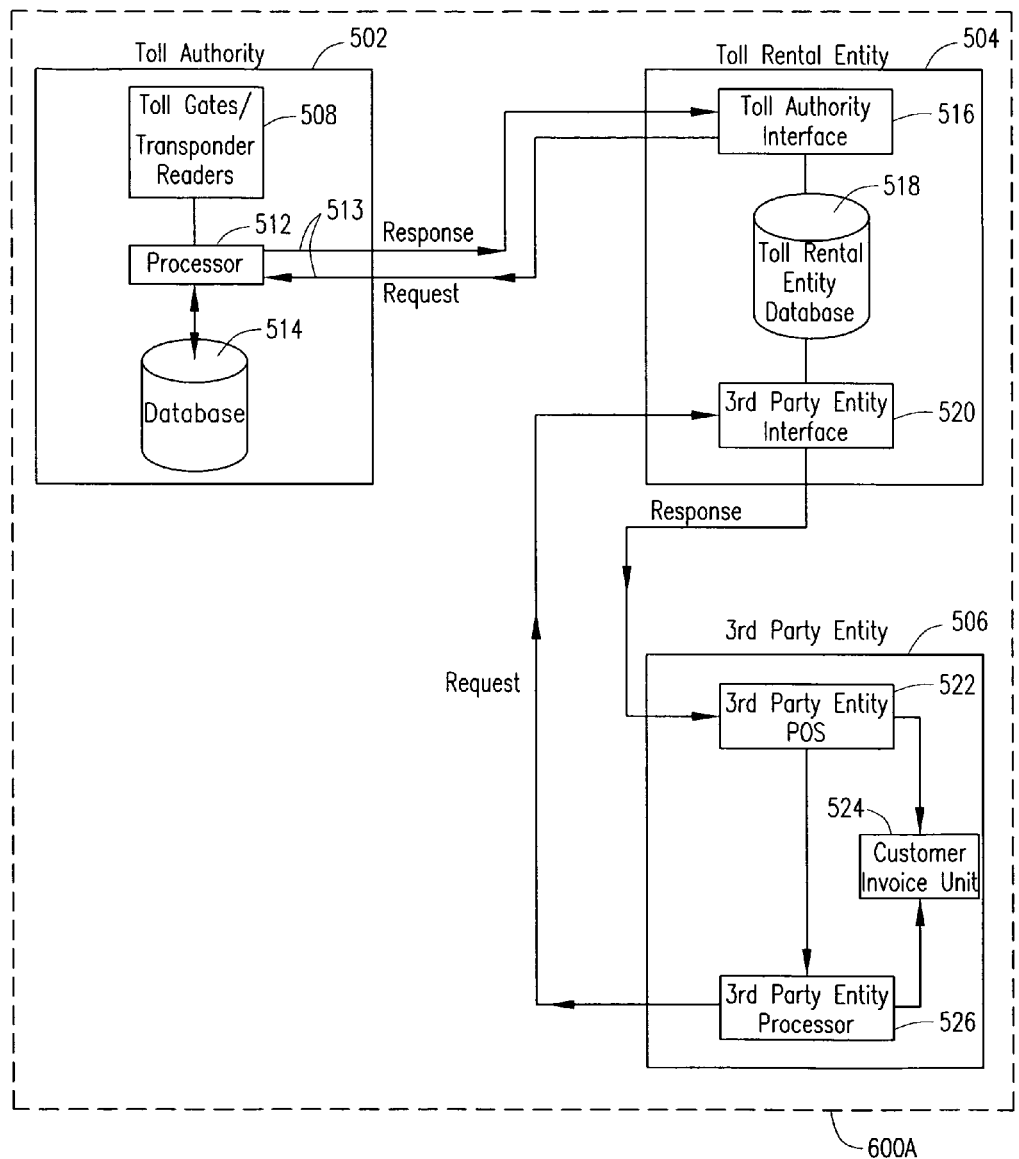
FIG. 6A illustrates a detailed block diagram of a toll fee system in accordance with an embodiment of the present invention.

FIG. 6A illustrates a detailed block diagram of a toll fee system 600A in accordance with an embodiment of the present invention. The toll fee system 600A provides information and records for accurate accounting of traffic activity and toll transactions for all transponders 300 having valid toll rental entity accounts. The toll fee system 600A performs various tasks such as, for example, monitoring toll collection, transferring toll collection data to various components of the system, and monitoring traffic activity. The toll fee system 600A expedites the toll fee process and completes the entire financial transaction at the time the vehicle operator such as, for example, a rental vehicle user returns the rental vehicle.

The toll fee system 600A maintains records of all toll transactions for all transponders 300 having valid toll rental entity accounts. These records are maintained and formatted for real-time or near real-time transmission to various elements within the toll fee system 600A. The toll fee system 600A includes a toll authority 502, a toll rental entity 504, and a third party entity 506. The toll authority 502 includes a plurality of toll gates 508 which are equipped with transponder reader units. The toll authority 502 further includes a processor 512 and a communications link 513 for bi-directional data communications with the toll rental entity 504. The processor 512 may be, for example, a conventional microcomputer or minicomputer, depending upon the size and the data-handling requirements of the toll fee system 600A. The processor 512 is interconnected to the transponder reader units 508 and a database 514. The processor 512 gathers toll fee tracking data from the transponder reader units 508 and stores the data into the database 514. The data is structured and transferred to the toll rental entity 504 using, for example, SOAP/XML. The database can be, for example, an Oracle™ database, a MS Access™ database, MS SQL, IBM DB2, and the like. The toll fee tracking data may include, for example, vehicle-class-identifiers, transaction time, transaction date, lane traffic activity information, transponder identification number, toll gate identification, vehicle travel direction and the amount of toll charged to the user. For simplicity, only one processor 512 and one database 514 is shown, however, a plurality of processors and databases may be employed by the toll authority 502.

The toll fee system 600A further includes a toll rental entity 504. The toll rental entity 504 acts as a communication channel between the toll authority 502 and the third party entity 506 for forwarding data from the toll authority 502 to the third party entity 506 in a real-time or near real-time fashion. The toll rental entity 504 may be, for example, a server capable of performing the various tasks which will be described later with respect to FIG. 7. The toll rental entity 504 includes a toll authority interface 516, a toll rental entity database 518, and a third party entity interface 520. The components 516, 518, and 520 as illustrated are for exemplary purposes. A detailed illustration of the various components and their functions will be shown and described later with respect to FIG. 7. The toll authority interface 516 may be, for example, a processor similar to the one disclosed earlier. The toll authority interface 516 is interconnected to the toll rental entity database 518 which in turn is connected to the third party entity interface 520. The toll authority interface 516 is adapted to send a request message to the processor 512 on the communications link 513. The request message is transmitted from the toll authority interface 516 to the processor 512 to obtain toll fee tracking data. For example, the request message may be transmitted at some predefined regular interval (e.g., one every two minutes) or continuously in real-time or near real-time. The processor 512 receives the request from the toll authority interface 516 and grants permission for the data to be pulled by the toll authority interface 516 residing within the toll rental entity 504. The data pulled by the toll rental entity 504 is stored in a data storage device such as, for example, a database 518 of the toll rental entity 504. The database can be, for example, an Oracle™ database, a MS Access™ database, MS SQL, IBM DB2, and the like. The toll authority interface 516 is also adapted to receive data from the toll authority 502 and convert the data into a format which is compatible for storage into the toll rental entity database 518.

The toll fee system 600A further includes a third party entity 506. The third party entity 506 includes a rental point-of-sale (POS) system 522, a customer invoice unit 524, and a third party entity processor 526. The third party entity interface 520 accesses the data from the database 518 and transmits the data to the third party entity POS system 522 within the third party entity 506. The data is then provided to the customer through a customer invoice unit 524 where the customer is charged the fee corresponding to the toll usage along with any relevant service charges and/or taxes. The customer invoice unit 524 may be, for example, a computer having printing capabilities. The customer invoice may be, for example, a printed invoice, an invoice which may be electronically transmitted to the customer, or the like. The rental authority processor 526 may also send a request message to the third party entity interface 520 requesting specific data corresponding to a particular customer or data relating to a particular time period. This data is transmitted to the rental POS 522 from the third party entity interface 520.

Figure 6B:
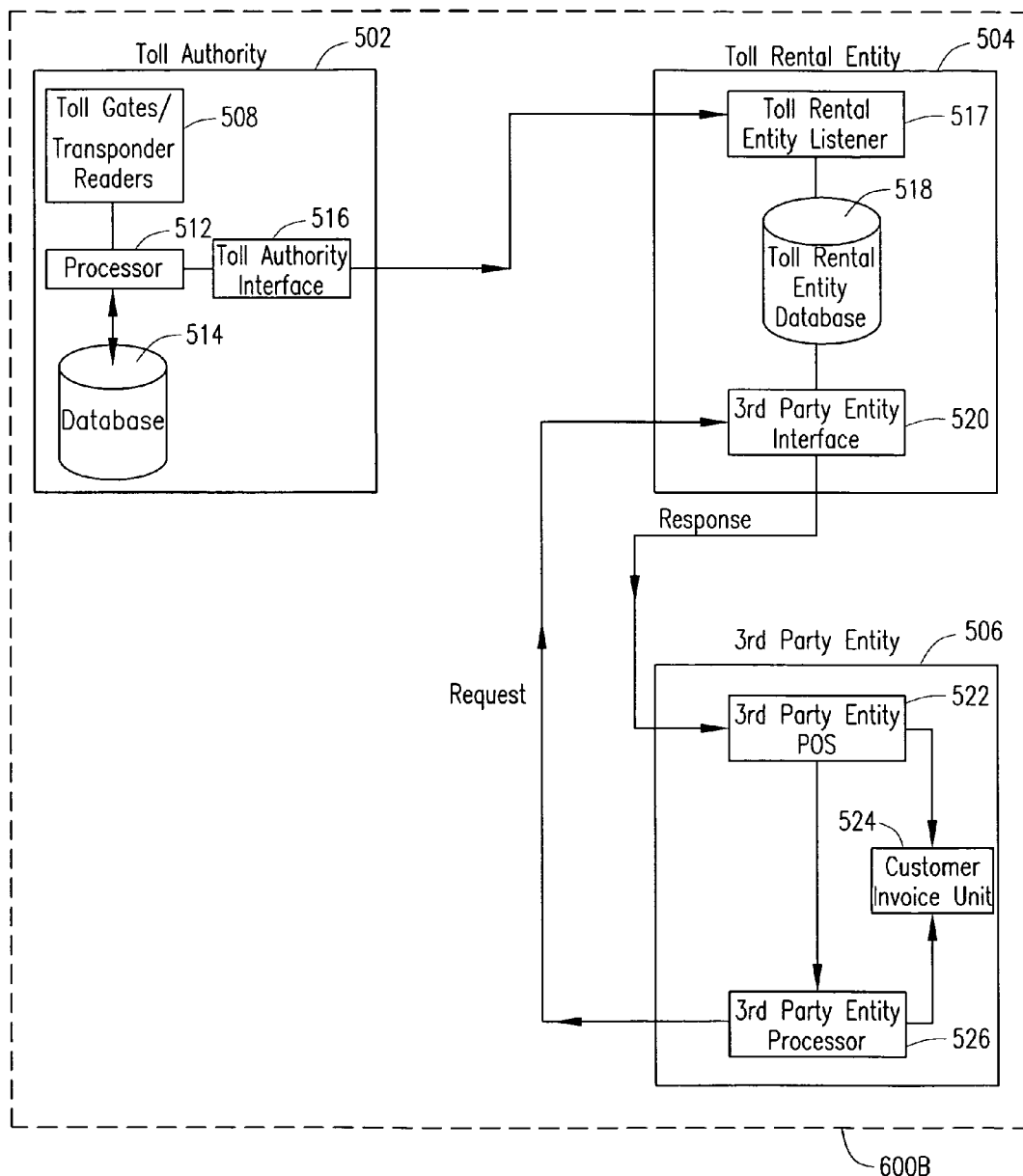
FIG. 6B illustrates a detailed block diagram of the toll fee system in accordance with an alternate embodiment of the present invention.

FIG. 6B illustrates a detailed block diagram of a toll fee system 600B in accordance with an alternate embodiment of the present invention. In this embodiment, the toll authority interface 516 resides within the toll authority 502. The toll authority interface 516 interfaces with a toll rental entity listener 517 within the toll rental entity 504. The toll rental entity listener 517 is adapted to receive data from the toll authority interface 516 and convert the data into a format which is compatible for storage into the toll rental entity database 518. In this embodiment, there is no need to send a request message from the toll rental entity 504 to obtain the data. The toll fee tracking data is periodically or continuously pushed from the toll authority interface 516 to the toll rental entity listener 517.

Figure 7:
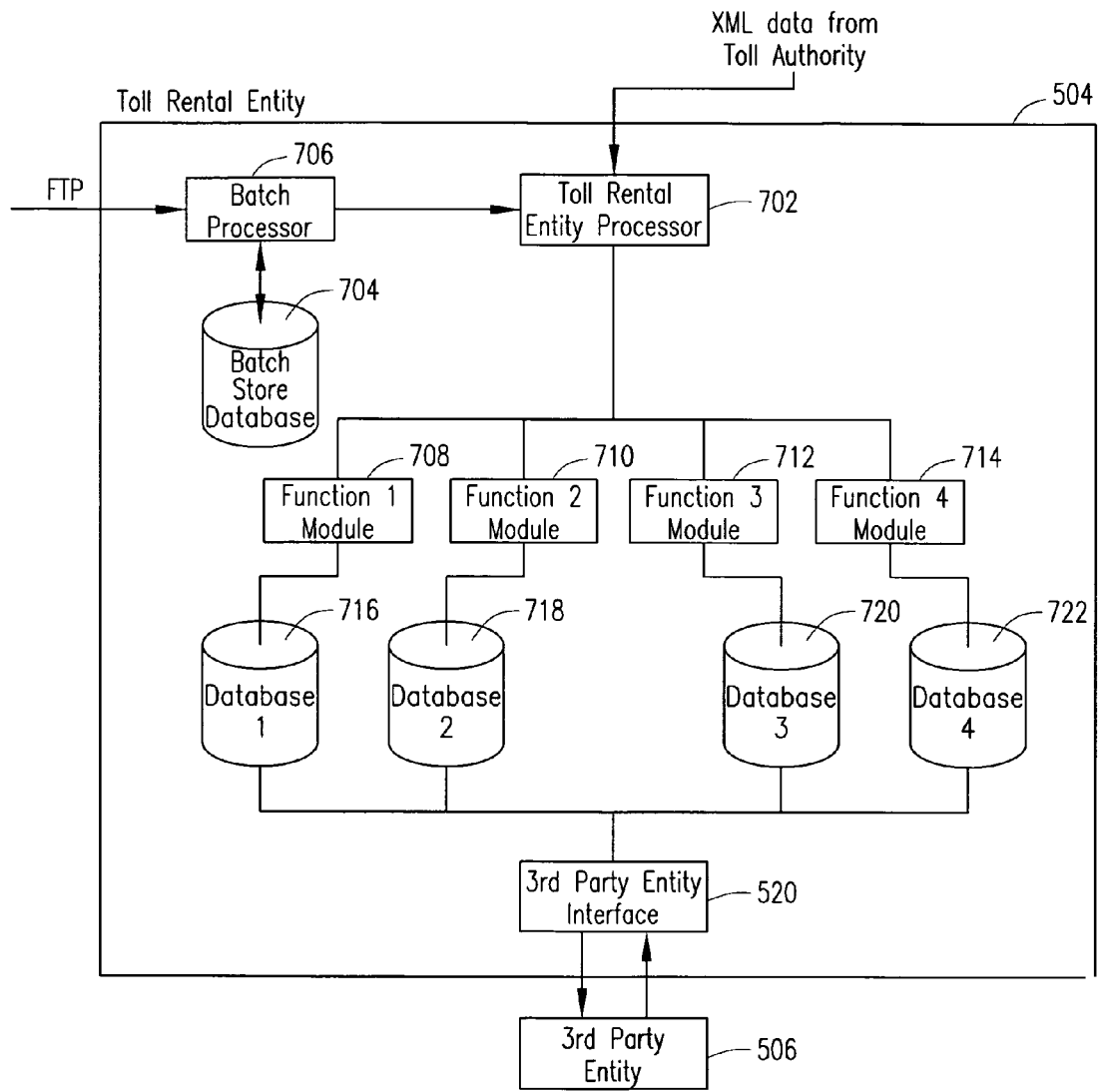
FIG. 7 illustrates a block diagram of a portion of the toll fee system of the present invention.

FIG. 7 illustrates a detailed block diagram of the toll rental entity 504 of the toll fee system of FIGS. 6A and 6B. The toll rental entity 504 may be, for example, a server for performing data analysis and data dissemination. The toll rental entity server 504 may include a plurality of processors such as, for example, a toll rental entity processor 702 and a batch processor 706. The processors 702 and 706 may be, for example, software systems or software components. In an embodiment of the present invention, the toll rental entity processor 702 is adapted to receive toll data from the toll authority 502 at some predefined regular intervals (e.g., every two minutes). In an embodiment, data transmission between the toll authority 502 and the toll rental entity server 504 may take place using, for example, XML, or any language specific formats. In another embodiment, data transmission between the toll authority 502 and the toll rental entity server 504 may take place using connection oriented or connection less communication protocols such as, for example, HTTP, TCP/IP, FTP etc.

The toll data is received by the toll rental entity processor 702. The toll rental entity processor 702 is adapted to analyze and disseminate the toll data and forward a request to at least one of the plurality of function modules 708, 710, 712, and 714. The request may be, for example, analyzing the toll data associated with a particular transponder and calculating an amount to be charged to a customer associated with the particular transponder. This function may be performed by, for example, function module 1708. The request may also include, for example, maintaining and updating toll rental entity accounts. This function may be performed by, for example, function module 710. The request may also include, for example, bill handling for updating charges associated with a particular transponder 300. This function may be performed by, for example, function module 712. Other functions may also be performed by the function modules 798, 710, 712, and 714 which may include, for example, payment handling, error handling, and the like. The plurality of function modules 708, 710, 712, and 714 are associated with a plurality of databases 716, 718, 720, and 722, respectively. The databases 716, 718, 720, and 722 are adapted to store data calculated by the function modules 708, 710, 712, and 714. The databases are connected to a third party entity interface 520 which is adapted to transmit information to the third party entity 506. The databases 716, 718, 720 and 722 may be, for example, Oracle™ databases, MS Access™ databases, MS SQL, IBM DB2, and the like. The transmission of data from the toll authority 502, the toll rental entity server 504, and the third part authority 506 takes place in a real-time or near real-time fashion. In an alternate embodiment of the present invention, the batch processor 706 is adapted to receive the toll data from the toll authority using connection less communications protocols such as, for example FTP. The toll data is received by the batch processor 706 at some predefined regular intervals (e.g., every hour). The toll data is transferred from the batch processor to the toll rental entity processor 702 for analysis and dissemination as disclosed earlier.

Figure 8:
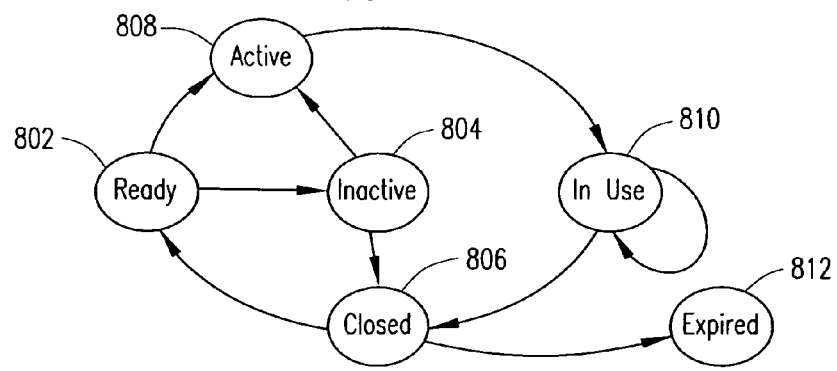
FIG. 8 illustrates a status diagram of a toll fee tracking device installed in each vehicle.

FIG. 8 illustrates a status diagram of the RFID transponder 300 as illustrated in FIG. 3. The transponder 300 is in a ready state 802 when a vehicle is ready to be rented to a customer. The ready state 802 indicates that the transponder 300 has already been assigned to a particular vehicle being operated by, for example, a rental vehicle user.

When the customer rents the rental vehicle from the third party entity 506, the customer has the option of accepting the automatic toll payment service provided by the toll rental entity 504. If the customer denies the automatic toll payment service, the transponder 300 goes into an inactive state 804. The transponder 300 remains in the inactive state 804 until the customer returns the car to the third party entity 506 or the customer uses a toll gate of the toll authority 502. Upon using the toll gate, the transponder 300 goes into an active state 808. Once the customer returns the car to the third party entity 506, the transponder 300 enters in a closed state 806 after which the status of the transponder will be changed for another customer.

However, if the customer accepts the automatic toll payment service, the transponder 300 goes into a ready state 802. When the customer uses the toll service for the first time, the system applies a minimum service charge and the status of the transponder 300 is changed to an active 808 state followed by the transponder 300 being changed to an inuse state 810.

In a situation when the transponder 300 is inactive and the customer uses the automatic toll payment service, the system applies a minimum service charge and updates the status of the transponder to active state 808 and in-use state 810, respectively.

When the customer returns the car to the third party entity 506, the third party entity 506 obtains transaction details of the transponder 300 using the toll rental entity listener 517 within the toll rental entity 504. Once the account is billed, the status of the transponder is changed to closed state 806. The closed state 806 indicates that the rental vehicle has been returned to the third party entity and the vehicle operator has been charged for the services utilized. Now the transponder 300 is ready to be reassigned. If for some reason the transponder 300 is malfunctioning, the transponder 300 returns to the closed state 806 followed by the transponder 300 going into an expired state 812.

Figure 9:
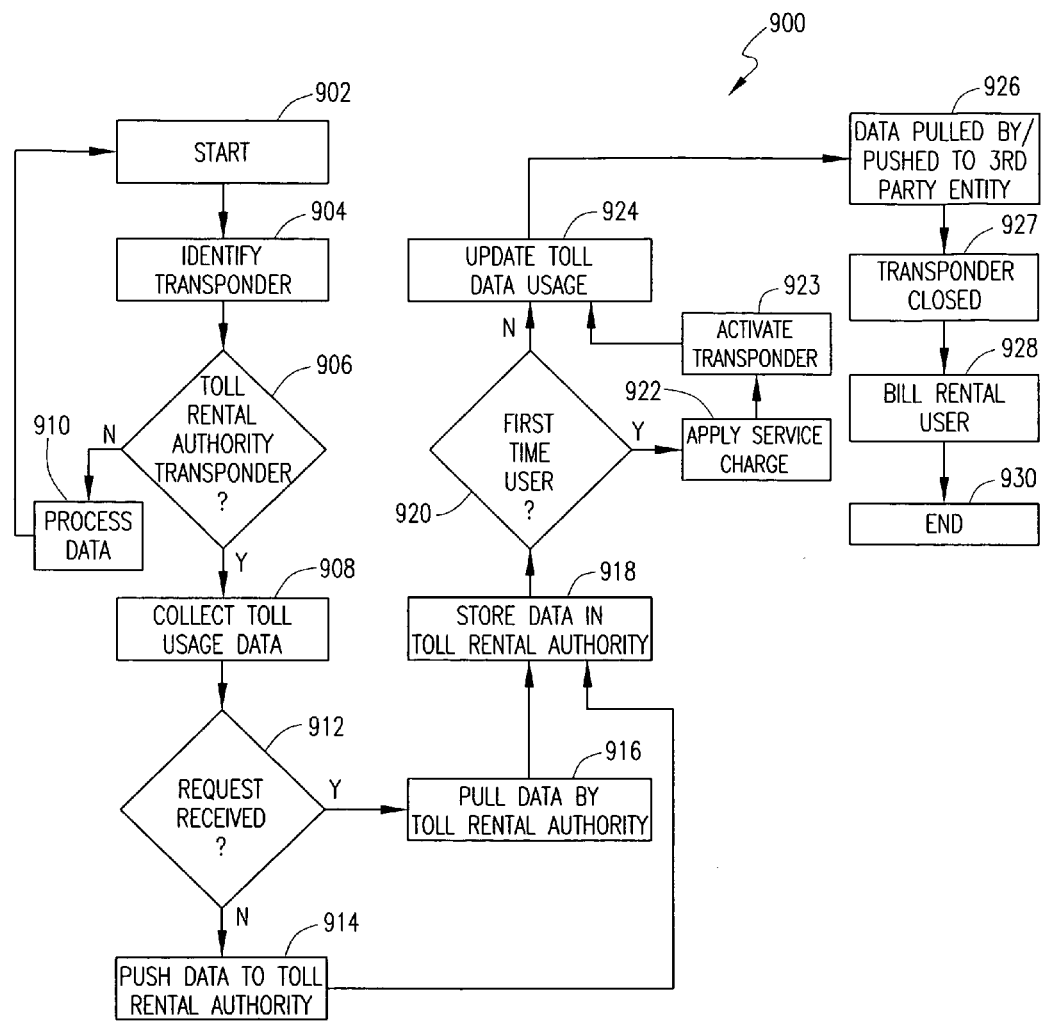
FIG. 9 illustrates a process flow diagram in accordance with the present invention.

FIG. 9 illustrates in detail a process flow 900 in accordance with the present invention. Although steps of the flow 900 are depicted in a particular sequence, it will be appreciated by persons of ordinary skill in the art that certain steps of the process need not necessarily follow a strict sequence but can be rearranged and/or performed simultaneously. The flow starts at step 902. At step 904, transponder data is read by the transponder readers 508 within the toll authority 502. The data may be, for example, vehicle-class-identifiers, transaction time, transaction date, lane traffic activity information, transponder identification number, toll gate identification, vehicle travel direction and the amount of toll usage to the user. At step 906, it is determined if the transponder identification data corresponds to the transponder identification data associated with the toll rental entity transponder. If it is determined that the transponder identification data does not corresponds to the transponder identification data associated with a toll rental entity transponder, the flow proceeds to step 910. At step 910, the data is processed by the toll authority 502 and the flow returns to step 902.

However, if it is determined at step 906 that the transponder identification data corresponds to the transponder identification data associated with the toll rental entity transponder, the process is continued at step 908. At step 908, the data is collected at a database 514 within the toll authority 502.

At step 912, it is determined if a request to share the data has been received by the processor 512 of the toll authority 502. The request may be sent by the toll authority interface 516 residing within the toll rental entity 504. The request may be, for example, a request message for allowing data to be pulled by the toll rental entity 504. For example, the request message may be transmitted at some predefined regular interval (e.g., one every two minutes) or continuously in real-time or near real-time. If it is determined that a request has been received by the processor 512 within the toll authority 502, the process is continued at step 916. At step 916, the data is pulled by the toll rental entity 504 and the process is continued at step 918. However, if it is determined at step 912 that a request has not been received, the process continues at step 914. At step 914, the toll authority pushes the data to the toll rental entity and the process is continued at step 918. At step 918, the data from steps 914 and 916 is stored in a database 518 within the toll rental entity 520.

At step 920, it is determined if a particular transponder associated with a user 300 is being used for the first time. If it is determined that the transponder is being used for the first time, the flow continues at step 922. At step 922, the user is charged a service fee and the process continues at step 923. At step 932, the transponder 300 is activated and the process continues at step 924. However, if it is determined at step 920 that the particular transponder 300 has been used before, the process continues at step 924. At step 924, the toll data usage is updated by processors within the toll rental entity 504. The process is continued at step 926 where the data is pushed from the toll rental entity 504 to the third party entity 506. At step 927, the transponder 300 is closed for further transaction until it is reassigned. At step 928, the user is provided with an invoice with charges related to the toll usage along with the charges associated with the use of the third party entity services such as, for example, charges related to vehicle rental. The process ends at step 930. The data transmission between the toll authority 502, the toll rental entity 504, and the third party entity 506 occurs at some predefined regular interval (e.g., one every two minutes) or continuously in real-time or near real-time.

It should be emphasized that the terms "comprise", "comprises", and "comprising", when used herein, are taken to specify the presence of stated features, integers, steps, or components, but do not preclude the presence or addition of one or more other features, integers, steps, components or groups thereof.

The previous Detailed Description is of embodiment(s) of the invention. The scope of the invention should not necessarily be limited by this Description. The scope of the invention is instead defined by the following claims and the equivalents thereof.

What is claimed is:

1. A toll fee tracking system comprising:
   a toll authority adapted to collect data associated with at least one toll fee tracking device;
   a toll rental entity adapted to communicate with said toll authority and a third party entity;
   wherein at least some of the collected data is transferred from the toll authority to the toll rental entity responsive to a request for data-transfer permission from the toll rental entity to the toll authority; and
   wherein said toll rental entity forwards at least some of said transferred data to said third party entity.

2. The system of claim 1, wherein said toll authority comprises: toll gates equipped with toll fee tracking device readers; at least one processor, wherein said at least one processor includes a bi-directional data communications link; and at least one database.

3. The system of claim 1, wherein said toll rental entity comprises: a toll authority interface adapted to communicate with said toll authority; at least one database; and a third party entity interface adapted to communicate with said third party entity.

4. The system of claim 1, wherein said third party entity comprises: at least one rental point-of-sale (POS) system; at least one invoice unit; and at least one processor.

5. The system of claim 1, wherein said toll rental entity comprises a stand alone unit.

6. The system of claim 5, wherein said toll rental entity comprises a server.

7. The system of claim 1, wherein said communication between said toll authority and said toll rental entity comprises pulling said data from said toll authority.

8. The system of claim 1, wherein said communication between said toll authority and said toll rental entity comprises pushing said data to said toll rental entity.

9. The system of claim 8, wherein said communication between said toll authority and said toll rental entity occurs in real-time.

10. The system of claim 1, wherein said communication between said toll authority and said toll rental entity occurs at predefined regular intervals.

11. The system of claim 1, wherein said communication between said toll rental entity and said third party entity comprises pushing said data to said third party entity.

12. The system of claim 11, wherein said communication between said toll rental entity and said third party entity occurs in real-time.

13. The system of claim 1, wherein said toll rental entity is adapted to be integrated within said third party entity.

14. The system of claim 1, wherein said data includes vehicle-class-identifiers, lane traffic activity, toll fee tracking device identification data, transaction time, transaction date, toll gate identification, vehicle travel direction, and toll fee data.

15. The system of claim 1, wherein said at least one toll fee tracking devices comprises a radio frequency integrated device (RFID) transponder.

16. The system of claim 15, wherein said RFID transponder comprises transponder identification data.

17. The system of claim 16, wherein said transponder identification data identifies a toll rental entity account with a toll authority account.

18. A method for toll fee tracking, the method comprising;
  providing, to a vehicle operator, an automatic toll payment service option;
  collecting, at a toll authority, data associated with at least one toll fee tracking device;
  storing said data in at least one database of said toll authority;
  transferring, from the toll authority to a toll rental entity via a toll authority interface, at least some of the collected and stored data in a toll rental entity database responsive to a request for data-transfer permission from the toll rental entity to the toll authority via the toll authority interface;
  forwarding, from the toll rental entity to a third party entity via a third party entity interface, at least some of the transferred data; and
  charging, via at least one rental point-of-sale (POS) system of the third party entity, the vehicle operator a fee corresponding to toll usage and applicable service charges based upon the forwarded data.

19. The method of claim 18, wherein said toll authority comprises: toll gates equipped with toll fee tracking device readers; at least one processor, wherein said at least one processor includes a bi-directional data communications link; and at least one database.

20. The method of claim 18, wherein said toll rental entity comprises: the toll authority interface adapted to communicate with said toll authority; at least one database; and the third party entity interface adapted to communicate with said third party entity.

21. The method of claim 18, wherein said third party entity comprises: the at least one rental point-of-sale (POS) system; at least one invoice unit; and at least one processor.

22. The method of claim 18, wherein said toll rental entity comprises a stand alone unit.

23. The method of claim 18, wherein said step of communicating between said toll authority and said toll rental entity comprises pulling said data from said toll authority.

24. The method of claim 18, wherein said step of communicating between said toll authority and said toll rental entity comprises pushing said data to said toll rental entity.

25. The method of claim 24, wherein said step of communicating occurs in real-time.

26. The method of claim 24, wherein said step of communicating occurs at predefined regular intervals.

27. The method of claim 18, wherein said toll rental entity is adapted to be integrated within said third party entity.

28. The method of claim 27, wherein said data includes vehicle-class-identifiers, lane traffic activity, toll fee tracking device identification data, and toll fee data.

29. The method of claim 18, wherein said at least one toll fee tracking devices comprises a radio frequency integrated device (RFID) transponder.

30. The method of claim 18, wherein the option comprises accepting the automatic toll payment service.

31. The method of claim 30, wherein the step of accepting causes the toll fee tracking device to enter an active state.

32. The method of claim 18, wherein the option comprises denying the automatic toll payment service.

33. The method of claim 32, wherein the step of denying causes the toll fee tracking device to enter an inactive state.

34. A toll rental entity server for communicating data between a toll authority and a third party entity, the server comprising:
  a first interface for communicating with said toll authority;
  at least one database;
  a second interface for communicating with said third party entity;
  wherein the toll rental entity server transmits a request message via the first interface to a toll authority processor to obtain toll fee tracking data;
  wherein the toll authority processor receives the request from the first interface and grants permission for the data to be pulled by the toll rental entity server via the first interface;
  wherein said toll rental entity server pulls the data from said toll authority via the first interface;
  wherein the toll rental entity server is adapted to analyze the data and calculate an amount to be charged to a vehicle operator associated with a particular toll fee tracking device and forwards the data to said third party entity via the second interface; and
  wherein upon return of a vehicle by the vehicle operator to the third party entity, the third party entity performs bill handling and is further adapted to charge, via at least one rental point-of-sale (POS) system of the third party entity, the vehicle operator a fee corresponding to toll usage and applicable service charges based upon the forwarded data and charges associated with a use of the vehicle of the third party entity.

* * * * *